(12) United States Patent
Utsunomiya

(10) Patent No.: US 10,934,767 B2
(45) Date of Patent: Mar. 2, 2021

(54) VACUUM INSULATING MATERIAL AND VACUUM INSULATING GLASS

(71) Applicant: Tangent Co., Ltd., Matsuyama (JP)

(72) Inventor: Takashi Utsunomiya, Matsuyama (JP)

(73) Assignee: Tangent Co., Ltd., Matsuyama (JP)

( * ) Notice: Subject to any disclaimer, the term of this patent is extended or adjusted under 35 U.S.C. 154(b) by 15 days.

(21) Appl. No.: 16/507,074

(22) Filed: Jul. 10, 2019

(65) Prior Publication Data

US 2019/0330914 A1   Oct. 31, 2019

Related U.S. Application Data

(63) Continuation-in-part of application No. PCT/JP2017/044669, filed on Dec. 13, 2017.

(30) Foreign Application Priority Data

Jan. 10, 2017   (JP) .............................. JP2017-001686

(51) Int. Cl.
*E06B 3/67*   (2006.01)
*B32B 3/10*   (2006.01)
(Continued)

(52) U.S. Cl.
CPC .............. *E06B 3/6715* (2013.01); *B32B 3/10* (2013.01); *B32B 7/02* (2013.01);
(Continued)

(58) Field of Classification Search
CPC ..................................................... E06B 3/6715
(Continued)

(56) References Cited

U.S. PATENT DOCUMENTS 5,284,692 A * 2/1994 Bell .......................... B32B 7/02
428/69

FOREIGN PATENT DOCUMENTS

| JP | H6-17579 A | 1/1994 |
|----|----|----|
| JP | 2004-11705 A | 1/2004 |
| JP | 2004-323317 A | 11/2004 |

OTHER PUBLICATIONS

International Search Report (ISR) and/or Written Opinion (WrOp), all apparently dated Feb. 6, 2018, in PCT/JP2017/044669, filed Dec. 13, 2017 and entitled "Vacuum Insulating Material and Vacuum Insulating Glass", of which the present application is a bypass continuation-in-part.

(Continued)

*Primary Examiner* — Brent T O'Hern
(74) *Attorney, Agent, or Firm* — JTT Patent Services, LLC; Gerald T. Peters

(57) ABSTRACT

Vacuum insulating glass or other such vacuum insulating material may be provided with a first plate and a second plate that are arranged in mutually opposed fashion so as to straddle therebetween a space of a gap that is a vacuum layer. The first plate may have, in order of lamination from the exterior, a first electrically conductive layer, and a first charged insulator. The second plate may have, in order of lamination from the exterior, a second electrically conductive layer, and a second charged insulator which is charged with charge of the same polarity as the first charged insulator. A repulsive force that is a Coulomb force which acts between the first charged insulator and the second charged insulator may substantially balance and counteract a tendency of ambient atmospheric pressure to reduce the length of the gap between the first plate and the second plate.

20 Claims, 3 Drawing Sheets

(51) Int. Cl.
- *B32B 7/02* (2019.01)
- *B32B 17/10* (2006.01)
- *C03C 17/36* (2006.01)
- *C03C 27/06* (2006.01)
- *E06B 3/66* (2006.01)
- *E06B 3/663* (2006.01)

(52) U.S. Cl.
CPC .... *B32B 17/10036* (2013.01); *B32B 17/1055* (2013.01); *C03C 17/3605* (2013.01); *C03C 17/3649* (2013.01); *C03C 27/06* (2013.01); *E06B 3/6612* (2013.01); *E06B 3/66328* (2013.01); *B32B 2255/205* (2013.01); *B32B 2255/28* (2013.01); *B32B 2307/202* (2013.01); *C03C 2217/213* (2013.01); *C03C 2217/252* (2013.01); *C03C 2217/253* (2013.01)

(58) Field of Classification Search
USPC .......................................................... 428/34
See application file for complete search history.

(56) References Cited

OTHER PUBLICATIONS

International Preliminary Report on Patentability (IPRP) and/or Written Opinion (WrOp), all apparently dated Jul. 16, 2019, in PCT/JP2017/044669, filed Dec. 13, 2017 and entitled "Vacuum Insulating Material and Vacuum Insulating Glass", of which the present application is a bypass continuation-in-part.

* cited by examiner

VACUUM INSULATING MATERIAL AND VACUUM INSULATING GLASS

CROSS-REFERENCE TO RELATED APPLICATION, PRIORITY CLAIMS, AND INCORPORATION BY REFERENCE

This application is a continuation-in-part of and claims benefit under 35 USC 120 and 365(c) to copending International Application No PCT/JP2017/044669, entitled "Vacuum Insulating Material and Vacuum Insulating Glass", filed 13 Dec. 2017; and further claims benefit of priority under 35 USC 119(a)-(d) to Japanese Patent Application No 2017-001686, entitled "Vacuum Insulating Material and Vacuum Insulating Glass", filed 10 Jan. 2017, the contents of both of which applications are incorporated herein in their entireties by reference.

FIELD OF THE INVENTION

The present invention relates to vacuum insulating glass and other such vacuum insulating material which is provided with vacuum layer(s).

BACKGROUND

As employment of a vacuum layer can greatly reduce thermal convection and conduction, a vacuum insulating material (e.g., vacuum insulating glass) which is an insulating material that is equipped with a vacuum layer may be favorably employed.

However, because atmospheric pressure will in general be exerted on the members that form the vacuum layer in a direction such as will tend to cause the vacuum layer to be compressed, to maintain the vacuum layer it is often necessary to install spacers or other such core materials within the vacuum layer so as to keep the vacuum layer from being subjected to contraction.

However, where such core material is installed within the vacuum layer of a vacuum insulating material, because there will be conduction of heat by way of the core material, this may lead to decrease in insulative performance. Furthermore, where transparent vacuum insulating glass is installed in the window of a building, core material may interfere with the field of view, impeding the visibility and/or field of view through the glass.

There is therefore a need for a vacuum insulating glass or other such vacuum insulating material that will allow a vacuum layer to be maintained even when core material is not installed therein.

SUMMARY OF INVENTION

One embodiment in accordance with one aspect of the present invention is a vacuum insulating glass or other such vacuum insulating material provided with a first plate and a second plate that are arranged in mutually opposed fashion so as to straddle therebetween a space of a gap that is a vacuum layer. The first plate may have, in order of lamination from the exterior, a first electrically conductive layer, and a first charged insulator. The second plate may have, in order of lamination from the exterior, a second electrically conductive layer, and a second charged insulator which is charged with charge of the same polarity as the first charged insulator. The constitution may be such that a repulsive force that is a Coulomb force which acts between the first charged insulator and the second charged insulator substantially balances and counteracts a tendency of ambient atmospheric pressure to reduce the length of the gap between the first plate and the second plate.

For good thermal insulative performance, pressure in the vacuum layer is preferably not greater than 25% of ambient atmospheric pressure, more preferably not greater than 10% of ambient atmospheric pressure, and most preferably not greater than 0.1% of ambient atmospheric pressure.

Vacuum insulating glass or other such vacuum insulating material in accordance with embodiments of the present invention may allow vacuum layer(s) to be maintained, i.e., may substantially prevent excessive reduction in the length of the gap between the first plate and the second plate, even when core material is not installed therein.

Other embodiments, systems, methods, and features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

EMBODIMENTS FOR CARRYING OUT INVENTION

First Embodiment

Figure 1:
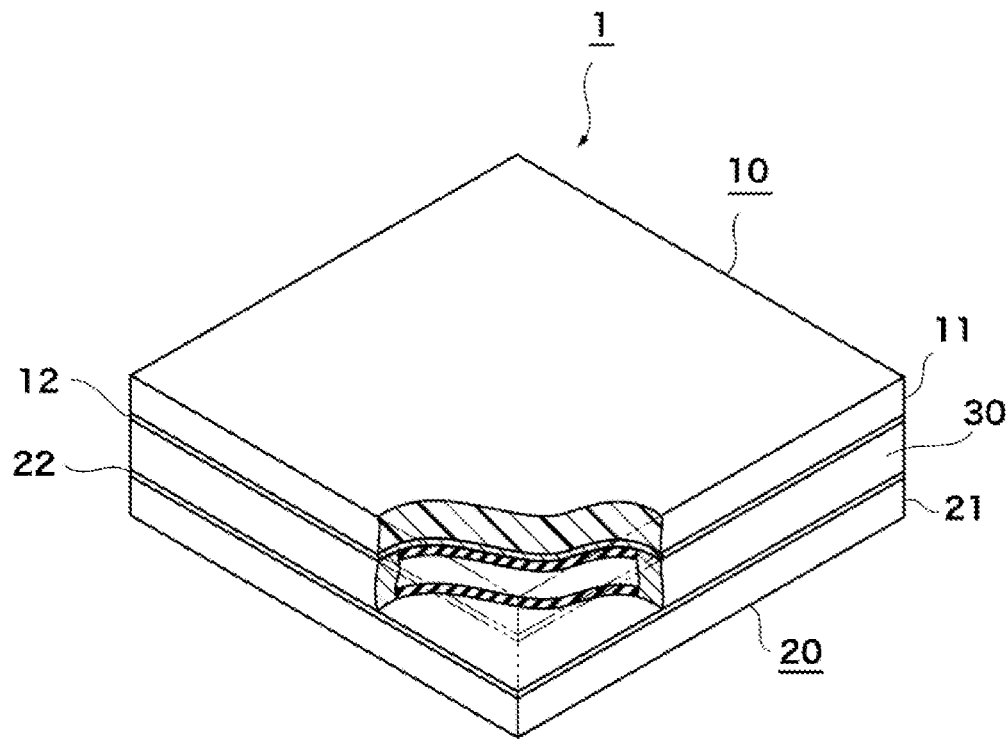
FIG. 1 is a perspective view of vacuum insulating material associated with a first embodiment of the present invention.
Figure 2:
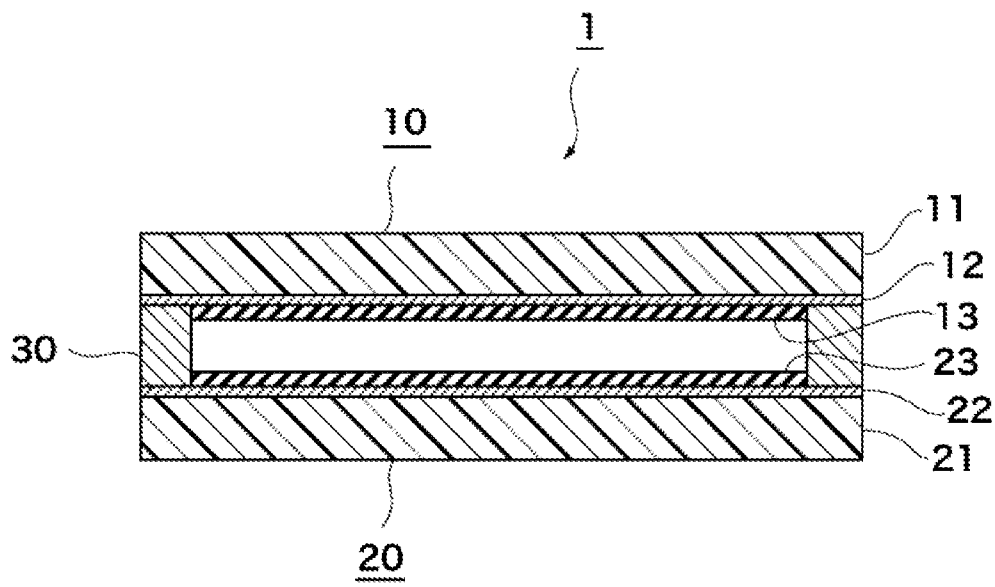
FIG. 2 is a sectional view of the vacuum insulating material associated with the first embodiment of the present invention.
Figure 3:
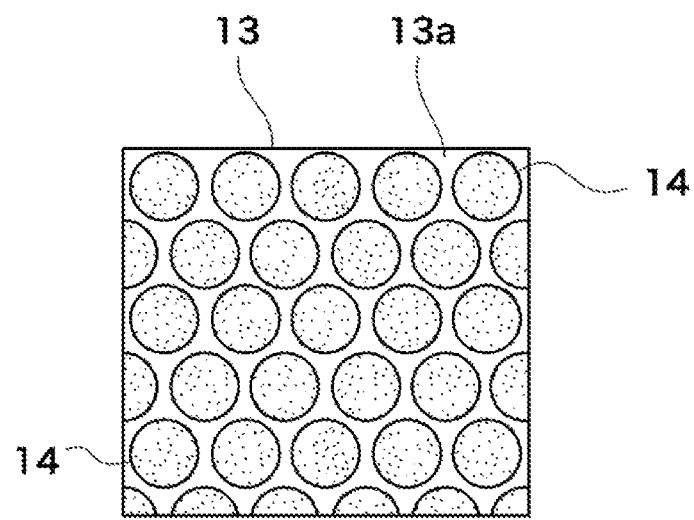
FIG. 3 shows charged regions at a charged insulator associated with the first embodiment of the present invention.

Below, a first embodiment of the present invention is described with reference to the drawings. The first embodiment will be described in terms of an example in which the present invention is applied to a vacuum insulating material. FIG. 1 is a perspective view of a vacuum insulating material associated with the first embodiment. FIG. 2 is a sectional view of the vacuum insulating material associated with the first embodiment. FIG. 3 is a drawing showing charged regions at a charged insulator associated with the first embodiment.

Vacuum insulating material 1 is provided with first plate 10, second plate 20, and electrically conductive sealing member 30 which holds first plate 10 and second plate 20 in a state in which they are mutually opposed in such fashion as to straddle a sealed space of a gap therebetween.

The sealed space of the gap between first plate 10 and second plate 20 is a vacuum layer, good insulative performance of vacuum insulating material 1 being maintained as a result of this vacuum layer. In accordance with the first embodiment, first plate 10 and second plate 20 are such that mutually facing first charged surface 13a and second charged surface are each charged with the same polarity of charge, i.e., positive charge, a repulsive force which is a Coulomb force acting on first plate 10 and second plate 20 in a direction such as will tend to cause these to be brought further apart.

Whereas atmospheric pressure acts on the first plate 10 and the second plate 20, which sandwich the vacuum layer therebetween, in a direction such as will tend to cause the vacuum layer to be compressed, i.e., in a direction such as will tend to cause the two to be brought nearer together, the fact that in accordance with the present embodiment the ambient atmospheric pressure which exists at the site where vacuum insulating material 1 is installed is balanced by this repulsive Coulomb force makes it possible for the structure of vacuum insulating material 1 to be maintained.

First plate 10 is provided with-in order of lamination from the exterior-first substrate 11, first electrically conductive layer 12, and first charged insulator 13, the entirety constituting a plate having plasticity. First substrate 11 is a base-like member made of flexible resin, it being possible, for example, to employ Nylon 6 (polyamide) or polyimide resin thereas.

First electrically conductive layer 12 is a layer of metal plating that may be formed by using aluminum, copper, or other such metal to apply plating to first substrate 11.

First charged insulator 13 is formed by charging the surface of an insulator, a positive charge being applied thereto in accordance with the present embodiment. More specifically, first electrically conductive layer 12 is coated with silica to form an insulating layer, and the inner surface of this insulating layer is then charged to a surface charge density of $2.5 \times 10^{-3}$ C/m$^2$.

As shown in FIG. 3, a multiplicity of circular first charged regions 14 are arrayed in regular fashion at prescribed pitch at first charged surface 13a of first charged insulator 13. The Coulomb force that would arise were uniformly charged infinitely large plane surfaces to be arranged in mutually opposed fashion is not dependent on the length of the gap between the planar plates but varies as a function of surface charge density.

In contrast, where, as in the present embodiment, circular first charged regions 14 are arrayed in regular fashion at first charged surface 13a, the Coulomb force that arises will depend on the length d of the gap between first charged insulator 13 and second charged insulator 23, a change in gap length d causing a change in the repulsive force that acts between plates 10, 20. In accordance with the present embodiment, the relationship between the gap length d and the repulsive force is such that an increase in gap length d will cause the repulsive force to decrease in monotonic fashion.

The structure of second plate 20 being the same as that of first plate 10, second plate 20 is provided with-in order of lamination from the exterior-second substrate 21, second electrically conductive layer 22, and second charged insulator 23, the entirety constituting a plate having plasticity.

Electrically conductive sealing member 30 is a plastic sealing member which in accordance with the present embodiment is similar to first electrically conductive layer 12, electrical conductivity being imparted thereto by means of copper, aluminum, or other such metal plating. Electrically conductive sealing member 30 causes first charged insulator 13 and second charged insulator 23 to face each another while causing first plate 10 and second plate 20 to be held in mutually opposed fashion so as to straddle a gap of 1 mm therebetween, and also seals the space of this gap.

To seal the space of the gap, electrically conductive sealing member 30 is in the shape of a quadrilateral frame, being installed in circumscribing fashion along the entire perimeters of mutually opposed first plate 10 and second plate 20. Because electrically conductive sealing member 30 is plastic, it permits relative movement over small distances between first plate 10 and second plate 20, such that gap length d is variable.

Furthermore, electrically conductive sealing member 30 which is installed in circumscribing fashion along the entire perimeters of plates 10, 20 is in electrical contact with first electrically conductive layer 12 and second electrically conductive layer 22, such that first electrically conductive layer 12, second electrically conductive layer 22, and electrically conductive sealing member 30 constitute a hollow conductor, the constitution being such that first charged insulator 13 and second charged insulator 23 are installed in mutually opposed fashion at this hollow portion.

Thus, arrangement of charged insulators 13, 23 at the hollow portion of a hollow conductor causes charged insulators 13, 23 to be electrostatically shielded by the hollow conductor (electrically conductive layers 12, 22 and electrically conductive sealing member 30), such that the electric field arising due to the charge at charged insulators 13, 23 does not extend to the exterior. To satisfactorily achieve electrostatic shielding, note that it is desirable that electrically conductive sealing member 30 be connected to ground during installation of vacuum insulating material 1.

The dimensions of vacuum insulating material 1 will now be described. First substrate 11 and second substrate 21 are 500 μm in thickness, first electrically conductive layer 12 and second electrically conductive layer 22 are 20 μm in thickness, first charged insulator 13 and second charged insulator 23 are 40 μm in thickness, and gap length d between plates 10, 20 is approximately 1 mm. Note, however, that gap length d varies with changes in atmospheric pressure. Furthermore, charged regions 14, 24 of charged insulators 13, 23 are circles of diameter 2 mm.

The action of vacuum insulating material 1 will be described next. In the context of a vacuum insulating material 1 having such constitution, the Coulomb force that acts between first plate 10 and second plate 20 when these are charged with the same (positive) polarity of charge will be a repulsive force. On the other hand, atmospheric pressure acts on first plate 10 and second plate 20, the space of the gap between which is a vacuum, in a direction such as will tend to cause these to be brought into closer contact.

Whereas the atmospheric pressure that acts on plates 10, 20 is approximately 1 kgf/cm$^2$, the repulsive force F constituting the Coulomb force—given the assumption of uniformly charged infinitely large planar plates (ideal charged plane surfaces)—will be a function of the surface charge density of charged insulators 13, 23, which may be expressed as $F = \sigma^2/2\varepsilon_0$, where $\sigma$=surface charge density, and $\varepsilon_0$=the permittivity of a vacuum.

As described above, in accordance with the present embodiment, $\sigma = 2.5 \times 10^{-3}$ C/m$^2$, and so, for ideal charged plane surfaces, the repulsive force F that arises at this time will be 1.44 kgf/cm$^2$. On the other hand, because, in accordance with the present embodiment, charged regions are circular regions arrayed at prescribed pitch, the repulsive force F is smaller than would be the case with ideal charged plane surfaces (1.44 kgf/cm$^2$), being a value in the vicinity of approximately 1 kgf/cm$^2$, which is the same as the atmospheric pressure, when gap length d between first plate 10 and second plate 20 is 1 mm.

While the surface charge density at charged insulators 13, 23 may of course be varied as appropriate, it is preferred as in the present embodiment that a margin of safety be employed such that the repulsive force F as calculated based on the assumption of ideal charged plane surfaces is not less than on the order of 40 percent larger than the atmospheric pressure.

Atmospheric pressure varies depending on altitude and climate. On the other hand, the repulsive force F that acts between first plate 10 and second plate 20 is balanced by the variation in the length d of the gap between first plate 10 and second plate 20, and the straddling thereof at the interior and exterior by first plate 10 and second plate 20 which are plastic plates, that occur in conformity with atmospheric pressure.

Moreover, as electrically conductive sealing member 30 which holds first plate 10 and second plate 20 in mutually opposed fashion is a plastic member, change in the length d of the gap between first plate 10 and second plate 20 is permitted as a result of deformation of electrically conductive sealing member 30.

Thus, in the context of the vacuum insulating material 1 associated with the present embodiment, repulsive force F acting between plates 10, 20 is capable of varying in correspondence to any change in atmospheric pressure, such that even if there is a change in atmospheric pressure it will be possible for the state of balance between repulsive force F and atmospheric pressure to be maintained as a result of the fact that this will also cause a change in the repulsive force in accompaniment to the deformation of vacuum insulating material 1, making it possible for the structure of vacuum insulating material 1 to be maintained in stable fashion.

Next, a method for manufacturing vacuum insulating material 1 will be described. First, aluminum, copper, or other such metal is used to apply plating to substrates 11, 21 to form electrically conductive layers 12, 22. Next, each of electrically conductive layers 12, 22 is coated with silica serving as insulator to form an insulating layer thereon, the upper surface (inner surface) of this insulating layer being further charged to the aforementioned prescribed positive charge density to form charged insulators 13, 23.

When charging an insulating layer to a prescribed charge density, an ion implanter may be used to cause the entire surface of the insulating layer to be charged to a charge density higher than the prescribed charge density, and thereafter using a static electricity remover to carry out static electricity removal until the prescribed charge density is attained. When carrying out static electricity removal, by using a surface potential gauge or the like to measure the surface potential of charged insulators 13, 23 as static electricity removal is carried out, it will be possible to control charge density.

By so doing, it will be possible to manufacture first plate 10 in which first substrate 11, first electrically conductive layer 12, and first charged insulator 13 are laminated in order from the bottom thereof; and second plate 20 in which second substrate 21, second electrically conductive layer 22, and second charged insulator 23 are laminated in order from the bottom thereof.

Next, first charged insulator 13 and second charged insulator 23 are made to face each other, and first plate 10 and second plate 20 are laminated together in such fashion as to be mutually opposed across a prescribed gap (d=1 mm) that intervenes therebetween. The laminating of these together is carried out within a vacuum chamber, the perimeters of first plate 10 and second plate 20 being covered by electrically conductive sealing member 30 to seal the space of the gap. As a result of carrying out the foregoing operations, vacuum insulating material 1 in which vacuum conditions exist at a sealed space of a gap is manufactured.

It is of course possible to vary manufacturing operations as appropriate; for example, to achieve vacuum conditions at the sealed space of the gap, instead of carrying out the operation in which first plate 10 and second plate 20 are laminated together within a vacuum chamber, the two plates 10, 20 may be laminated together under conditions of atmospheric pressure, with creation of a vacuum in the space of the gap being thereafter carried out as electrically conductive sealing member 30 is installed.

As described above, vacuum insulating material 1 associated with the first embodiment is provided with a vacuum layer between first plate 10 and second plate 20, permitting thermal convection and conduction to be suppressed, and good insulative performance to be achieved.

In particular, in accordance with the present embodiment, there being no need to install spacers or other such core materials in the space of the gap at vacuum insulating material 1, a repulsive force which is a Coulomb force being used to maintain the vacuum layer, achievement of a simple structure is made possible; and moreover, as there is no conduction of heat by way of core material, achievement of good insulative performance is made possible. Furthermore, because no core material is installed in the vacuum layer, it is possible to achieve good soundproofing performance.

Furthermore, at vacuum insulating material 1, because charged insulators 13, 23 are arranged at, and are electrostatically shielded by, the hollow portion of the hollow conductor that comprises electrically conductive layers 12, 22 and electrically conductive sealing member 30, the electric field has no effect on the exterior.

Furthermore, while charge typically tends to migrate and it is not without difficulty that a charged state can be maintained, because in accordance with the present embodiment charged surfaces 13a, 23a of charged insulators 13, 23 are installed on insulators having high electrical resistivity within a vacuum layer, it is possible for charged state to be maintained in stable fashion without occurrence of migration of charge.

As insulating material for charged insulators 13, 23, so long as it is a material having high electrical resistivity, other insulating material(s) may be employed as appropriate. The silica (quartz) employed in the present embodiment has an electrical resistivity of approximately $10^{16}$ Ωm; to permit charged state to be maintained in stable fashion it is preferred that an insulating material having an electrical resistivity of not less than $10^{15}$ Ωm be employed, it being possible, for example, to employ polyethylene or the like.

Second Embodiment

Figure 4:
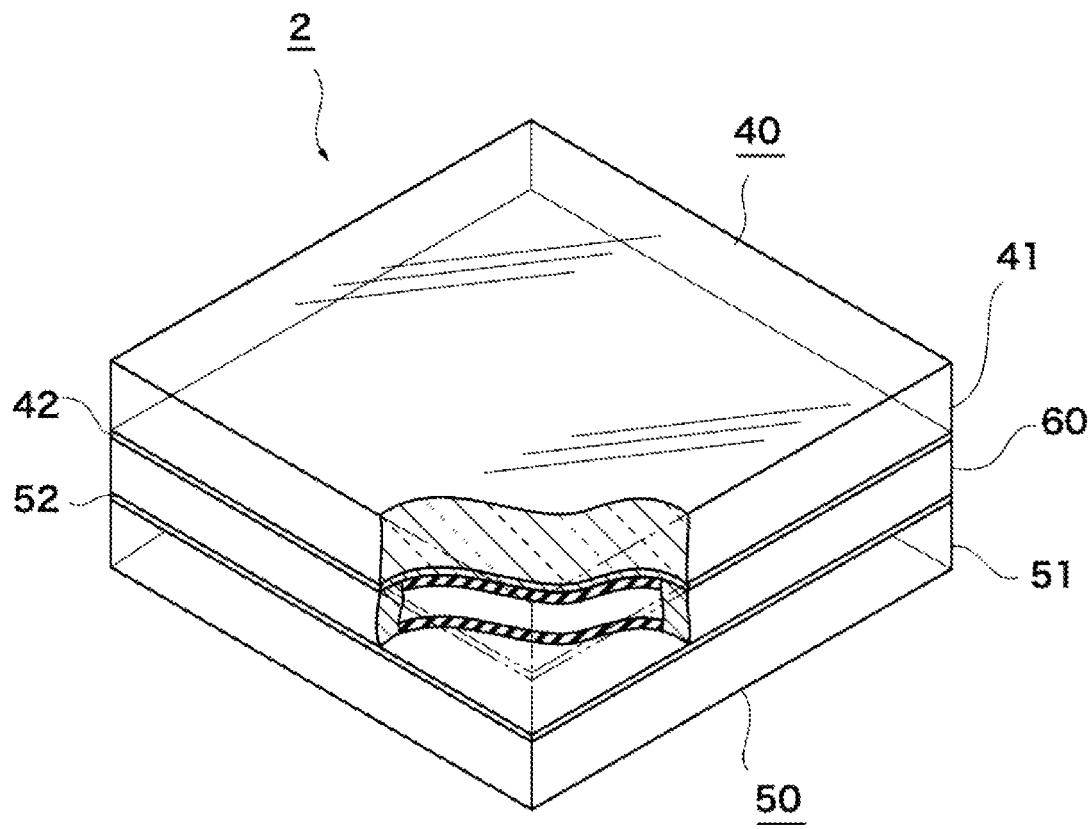
FIG. 4 is a perspective view of vacuum insulating glass associated with a second embodiment of the present invention.
Figure 5:
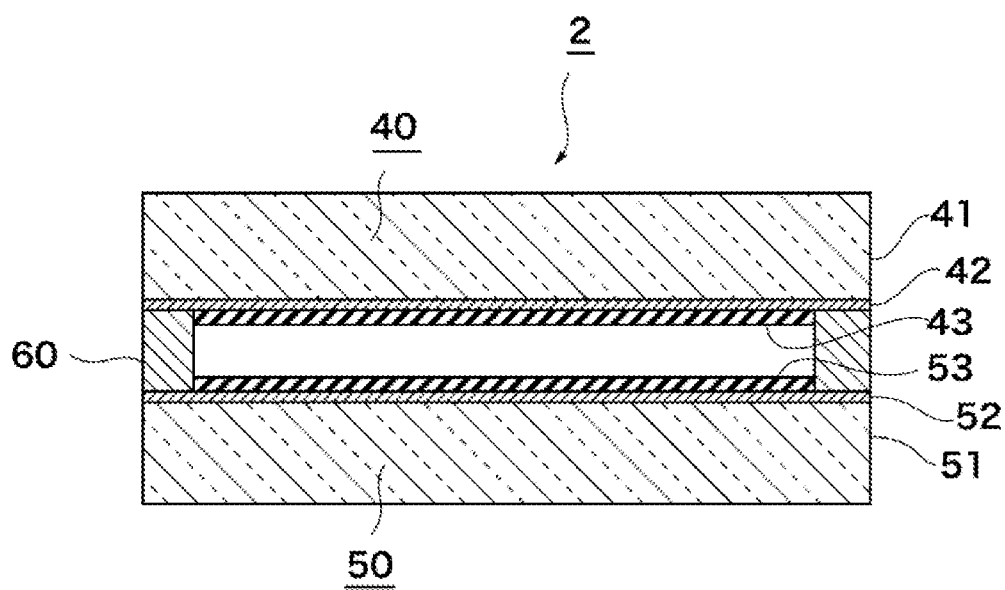
FIG. 5 is a sectional view of vacuum insulating glass associated with the second embodiment of the present invention.

A second embodiment of the present invention will now be described. The second embodiment will be described in terms of an example in which the present invention is applied to vacuum insulating glass. FIG. 4 is a perspective view of vacuum insulating glass associated with the second embodiment of the present invention. FIG. 5 is a sectional view of vacuum insulating glass associated with the second embodiment of the invention. Because vacuum insulating glass 2 associated with the second embodiment is similar in constitution to vacuum insulating material 1 associated with the foregoing first embodiment, description will be omitted where the constitutions are similar.

Vacuum insulating glass 2 is provided with first plate 40, second plate 50, and electrically conductive sealing member 60 which holds first plate 40 and second plate 50 in a state in which they are mutually opposed in such fashion as to straddle a sealed space of a gap therebetween.

The sealed space of the gap between first plate 40 and second plate 50 is a vacuum layer, insulative characteristics of vacuum insulating glass 2 being maintained as a result of this vacuum layer. In accordance with the second embodiment as well, first plate 40 and second plate 50 are such that mutually facing surfaces are each positively charged, a repulsive force which is a Coulomb force acting on first plate 40 and second plate 50 in a direction such as will tend to cause these to be brought further apart. As was the case with the first embodiment, the structure of vacuum insulating glass 2 is maintained as a result of the fact that this repulsive force is made to balance atmospheric pressure.

First plate 40 is provided with—in order of lamination from the exterior—first substrate 41, first electrically conductive layer 42, and first charged insulator 43. First substrate 41 is transparent plate glass, it being possible, for example, to employ float glass thereas.

First electrically conductive layer 42 is an electrically conductive layer of low-E metal film which is formed at a thickness of 10 nm over first substrate 41. The low-E metal film might, for example, have a multilayer film structure in which silver and a metal oxide that protects the silver are arranged in layered fashion. First charged insulator 43 is similar in constitution to first charged insulator 13 of the foregoing first embodiment, charged regions such as are shown at FIG. 3 being formed thereat in similar fashion as in the first embodiment.

The structure of second plate 50 being the same as that of first plate 40, second plate 50 is provided with-in order of lamination from the exterior-second substrate 51, second electrically conductive layer 52, and second charged insulator 53. The constitution of electrically conductive sealing member 60 is similar to that of electrically conductive sealing member 30 associated with the foregoing first embodiment.

The dimensions of vacuum insulating glass 2 will now be described. First substrate 41 and second substrate 51, which are plate glass, are 3 mm in thickness; first electrically conductive layer 42 and second electrically conductive layer 52 are 10 nm in thickness; first charged insulator 43 and second charged insulator 53 are 40 μm in thickness; and gap length d between plates 40, 50 is approximately 1 mm. Note, however, that gap length d varies in correspondence to changes in atmospheric pressure.

The vacuum insulating glass 2 having such constitution exhibits similar operation and effect as are exhibited by vacuum insulating material 1 of the foregoing first embodiment, the fact that a repulsive force which is a Coulomb force causes the space of a gap at which there is a vacuum between plates 40, 50 to be maintained making it possible to provide a vacuum insulating glass in which there are no spacers or other such core materials.

With transparent glass windows that are used as windows or the like in a building, whereas installation therein of a multiplicity of spacers to maintain the space of a gap at which there is a vacuum may interfere with the field of view through the glass window and impair the visual attractiveness thereof, with vacuum insulating glass 2 associated with a preferred embodiment such problems need not occur, as spacers for maintaining the space of the gap at which there is a vacuum are unnecessary.

While embodiments of the present invention have been described above, modes of carrying out the present invention are not limited to the foregoing embodiments, a great many variations being possible without departing from the gist of the present invention. For example, the shapes, sizes, materials, and so forth of the respective parts that make up the vacuum insulating material and/or vacuum insulating glass may be varied as appropriate.

Furthermore, the charged configuration at the charged insulators, i.e., the shape, size, arrayed configuration, arrayed pitch, and so forth of the charged regions, may also be varied as appropriate. Note, however, that to prevent nonuniformity of charge, it is preferred that the shape of the charged regions be circular, elliptical, or in the shape of regular polygon(s).

Furthermore, to permit generation of a repulsive force F of appropriate magnitude, the charged regions, which may for example be circular in shape, are each preferably 0.5 mm to 5.0 mm in size, more preferably 1.0 mm to 3.0 mm in size, and most preferably 1.5 mm to 2.5 mm in size, at their widest dimension.

Moreover, to permit generation of a repulsive force F of appropriate magnitude, it is preferred that gap length d between the first plate and the second plate be 0.25 times to 2.0 times the average value of the widest dimension of the charged regions; for example, where the charged regions are circular in shape, the widest dimension thereof would be the diameter of the circular charged regions.

Furthermore, the charged insulators may be negatively charged. Furthermore, the charging method is not limited to ion implantation, it being possible to employ triboelectric charging, charging by means of peeling apart, charging by means of induction, charging by means of polarization, coating of an insulator with a charged body, and/or any other charging method as appropriate. Moreover, whereas thickness of the silica coatings serving as charged insulators in the foregoing embodiments was 40 μm, charged insulators of any appropriate thickness may be employed; for example, charged insulator thickness may preferably be 1 μm to 80 μm, more preferably be 10 μm to 60 μm, and most preferably be 30 μm to 50 μm.

Furthermore, whereas in the foregoing embodiment the repulsive force F is made to vary as a function of the flexing of, and the change in the length d of the gap between, the plates so as to accommodate any change in atmospheric pressure, the constitution may be such that the repulsive force F is made to vary only as a function of the change in the length d of the gap between the plates, or the constitution may be such that the repulsive force F is made to vary only as a function of the flexing of the plates.

Furthermore, whereas in the foregoing embodiment an electrically conductive layer and a charged insulator are laminated in order over a substrate, in an embodiment in which the charged insulator is also made to function as substrate there is no need to separately provide a substrate. For example, where polyethylene is employed as insulating material, by charging the inner surface of a polyethylene insulating base-like member and by forming a layer of metal plating at the exterior surface thereof, it will be possible to constitute a vacuum insulating material that comprises an electrically conductive layer and a charged insulator which also serves as substrate.

EXPLANATION OF REFERENCE NUMERALS

1 Vacuum insulating material
10 First plate

11 First substrate
12 First electrically conductive layer
13 First charged insulator
14 First charged regions
20 Second plate
21 Second substrate
22 Second electrically conductive layer
23 Second charged insulator
24 Second charged regions
30 Electrically conductive sealing member
2 Vacuum insulating glass
40 First plate
41 First substrate
42 First electrically conductive layer
43 First charged insulator
50 Second plate
51 Substrate
52 Second electrically conductive layer
53 Second charged insulator
60 Electrically conductive sealing member

What is claimed is:

1. A vacuum insulating material comprising:
    a first plate and a second plate that are arranged in mutually opposed fashion so as to straddle therebetween a space of a gap that is a vacuum layer;
    wherein the first plate has, in order of lamination from the exterior, a first electrically conductive layer, and a first charged insulator;
    wherein the second plate has, in order of lamination from the exterior, a second electrically conductive layer, and a second charged insulator which is charged with charge of the same polarity as the first charged insulator;
    wherein a repulsive force that is a Coulomb force which acts between the first charged insulator and the second charged insulator substantially balances and counteracts a tendency of ambient atmospheric pressure to reduce length of the gap between the first plate and the second plate;
    wherein charged regions are arrayed on the first inner surface and the second inner surface; and
    wherein the charged regions are each 0.5 mm to 5.0 mm in size at their widest dimension.

2. The vacuum insulating material according to claim 1 wherein the charged regions are in a shape of circles that are substantially 2 mm in diameter.

3. The vacuum insulating material according to claim 1 wherein the first plate and the second plate are plastic plates, flexing of the first plate and the second plate toward the interior or the exterior causing a change in the repulsive force.

4. The vacuum insulating material according to claim 1 wherein pressure in the vacuum layer is not greater than 25% of the ambient atmospheric pressure.

5. The vacuum insulating material according to claim 1 wherein the length of the gap is 0.25 times to 2.0 times an average value of the widest dimension of the charged regions.

6. The vacuum insulating material according to claim 1 wherein the first charged insulator and the second charged insulator are formed from materials of electrical resistivity not less than $10^{15}$ Ωm.

7. The vacuum insulating material according to claim 1 wherein the first charged insulator and the second charged insulator comprise silica coatings of thickness 1 μm to 80 μm.

8. The vacuum insulating material according to claim 1 wherein the Coulomb force which acts between the first charged insulator and the second charged insulator as calculated based on an assumption of ideal charged plane surfaces is not less than on the order of 40 percent larger than the ambient atmospheric pressure.

9. The vacuum insulating material according to claim 1 wherein surface charge density on the first charged insulator and the second charged insulator as calculated based on an assumption of ideal charged plane surfaces are each not less than on the order of $2.5 \times 10^{-3}$ C/m².

10. The vacuum insulating material according to claim 1 wherein the first plate and the second plate respectively comprise a first substrate and a second substrate, the first substrate and the second substrate respectively serving as the first charged insulator and the second charged insulator.

11. The vacuum insulating material according to claim 10 wherein the first substrate and the second substrate are respectively formed from polyethylene.

12. The vacuum insulating material according to claim 1 wherein the charged regions are circular in shape.

13. The vacuum insulating material according to claim 1 wherein the charged regions are elliptical in shape.

14. The vacuum insulating material according to claim 1 wherein the charged regions are regular polygonal in shape.

15. A vacuum insulating material comprising:
    a first plate and a second plate that are arranged in mutually opposed fashion so as to straddle therebetween a space of a gap that is a vacuum layer; and
    a plastic electrically conductive sealing member that causes perimeter portions of the first plate and the second plate which are arranged in mutually opposed fashion to be held in mutually opposed fashion, and that seals the space of the gap;
    wherein the first plate has, in order of lamination from the exterior, a first electrically conductive layer, and a first charged insulator;
    wherein the second plate has, in order of lamination from the exterior, a second electrically conductive layer, and a second charged insulator which is charged with charge of the same polarity as the first charged insulator;
    wherein a repulsive force that is a Coulomb force which acts between the first charged insulator and the second charged insulator substantially balances and counteracts a tendency of ambient atmospheric pressure to reduce length of the gap between the first plate and the second plate; and
    wherein change in the length of the gap between the first plate and the second plate causes a change in the repulsive force.

16. The vacuum insulating material according to claim 15 wherein the first charged insulator and the second charged insulator are electrostatically shielded by the first electrically conductive layer, the second electrically conductive layer, and the electrically conductive sealing member.

17. The vacuum insulating material according to claim 15 wherein the electrically conductive sealing member is arranged in circumscribing fashion along the entire perimeters of the first plate and the second plate.

18. The vacuum insulating material according to claim 15 wherein the electrically conductive sealing member is in electrical contact with the first electrically conductive layer and the second electrically conductive layer.

19. A vacuum insulating material comprising:
a first plate and a second plate that are arranged in mutually opposed fashion so as to straddle therebetween a space of a gap that is a vacuum layer;
wherein the first plate has, in order of lamination from the exterior, a first electrically conductive layer, and a first charged insulator;
wherein the second plate has, in order of lamination from the exterior, a second electrically conductive layer, and a second charged insulator which is charged with charge of the same polarity as the first charged insulator;
wherein a repulsive force that is a Coulomb force which acts between the first charged insulator and the second charged insulator substantially balances and counteracts a tendency of ambient atmospheric pressure to reduce length of the gap between the first plate and the second plate; and
wherein the vacuum insulating material is vacuum insulating glass, and wherein the first plate and the second plate respectively comprise a first substrate and a second substrate that are formed from plate glass.

20. The vacuum insulating material according to claim 19 wherein the first substrate and the second substrate are substantially transparent.

* * * * *